April 28, 1970     K. J. RICHARDS     3,508,323

PROCESS FOR FLAME CUTTING

Filed March 11, 1968

— EXCESS CUT OFF BY FLAME
— THICKNESS OF FLAME CUT
— OXIDE LAYER GRIT BLASTED
— MACHINED

INVENTOR
KENNETH J. RICHARDS
BY Charles A. Warren
ATTORNEY

United States Patent Office 3,508,323
Patented Apr. 28, 1970

3,508,323
PROCESS FOR FLAME CUTTING
Kenneth J. Richards, North Sommers, Conn., assignor to United Aircraft Corporation, East Hartford, Conn., a corporation of Delaware
Filed Mar. 11, 1968, Ser. No. 712,219
Int. Cl. B23p 13/04
U.S. Cl. 29—558         6 Claims

ABSTRACT OF THE DISCLOSURE

In flame cutting workpieces or blocks of titanium and similar metals, and alloys of these metals, the cut is made at such a rate and under such other cutting conditions as to produce a thin brittle layer of alpha-oxide that may be readily removed prior to machining the workpiece to finished dimension.

BACKGROUND OF THE INVENTION

This invention relates to the flame cutting of reactive metals such as titanium and is particularly concerned with flame cutting excess material from forged or otherwise produced workpieces to shape the workpiece and thereby to reduce the time necessary to machine the workpiece to its finished dimensions.

The reactive metals are not generally cut or machined with gas torches because the surfaces so cut exhibit a thick, adherent oxide layer that resists machining and is harder than the cutting tool so that the tool is dulled in a short time. The stock left on the workpiece must, therefore, be thick enough so that the cutting tool can undercut the oxide layer, resulting in increased machining time and excessive material losses.

SUMMARY OF INVENTION

By this invention, a process then is provided to produce a machinable surface on a workpiece of titanium or similar metal, or alloy of these metals, following the flame cutting of excess stock from the workpiece. It has been found that cutting the stock at a predetermined rate dependent upon the thickness of the stock and with an appropriate excess of oxygen in the flame will permit a relatively smooth cut surface with a relatively thin readily removable oxide layer. One step in the process of the invention is the removal of this oxide layer in readiness for machining of the workpiece. A particular advantage of the invention is that the flame cut surface is so smooth and the oxide layer so predictably thin that the flame cutting may be close enough to the finished dimension of the workpiece as to leave only a depth of approximately .250 inch or less of material to be machined away.

The use of oxygen in cutting or welding titanium has long been considered detrimental as evidenced by the patent to De Long No. 2,805,148, titanium displaying such an affinity for oxygen that unwanted properties are rapidly imparted to the titanium when it is heated in the presence of oxygen. One feature of the invention is to control the rate of the cutting action and the amount of preheat with respect to the cutting oxygen that a minimum of heat is absorbed by the workpiece and only a very thin surface layer of the titanium is contaminated or oxidized, this oxide film or layer, moreover, being extremely brittle and thereby readily removed.

In accordance with the invention, the workpiece is cut with a flame torch utilizing an excess of oxygen, with the rate of cutting so controlled that the oxide layer formed is alpha titanium oxide and is thin enough and brittle enough to be readily removed as by grit blasting or shot peening in readiness for final machining of the workpiece to finished dimension. Substantial savings in production time are realized where much of the excess material on the workpiece may be removed by flame cutting instead of by machining.

DESCRIPTION OF THE PREFERRED EMBODIMENT

Figure 1:
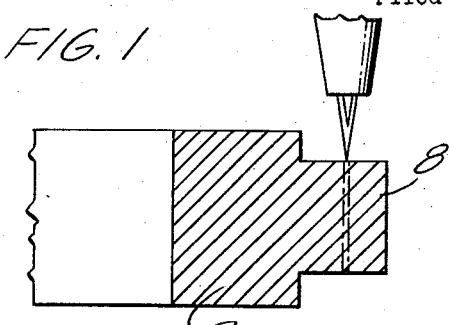
FIG. 1 is a sectional view through an annular workpiece having an excess of material to be removed by flame cutting.
Figure 6:
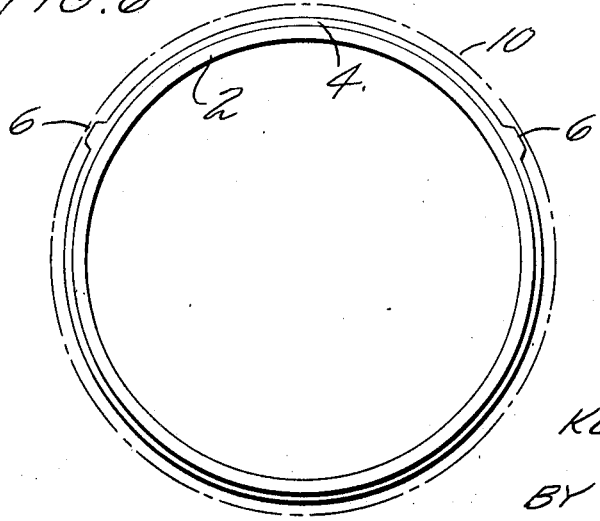
FIG. 6 shows a plan view of the finished workpiece.

Referring to the drawing, the finished workpiece, FIG. 6, is a ring 2 having a peripheral flange 4 on which are a pair of circumferentially spaced lugs 6. The cross section of this ring is shown in FIG. 1. The excess material 8 shown in FIG. 1 is removed from the periphery of the workpiece except at the points where the lugs 6 are located and the presence of these lugs necessitates the original configuration of the workpiece before any cutting operations are performed. The outer dimension of the unfinished workpiece is represented by the dot-dash line 10 of FIG. 6. Obviously removal of all the material between the line 10 and the finished outer surface of the workpiece would take many hours of machine time. For example, one workpiece to which the present invention has been applied, has a diameter of approximately 8 feet with an axial (vertical) dimension, as in FIG. 1, of about 10 inches. The axial dimension of the flange 4 is about 6 inches. Thus, it will be apparent that a unique and very expensive machine would be in operation for many hours if all the excess material were to be machined off.

Figure 3:
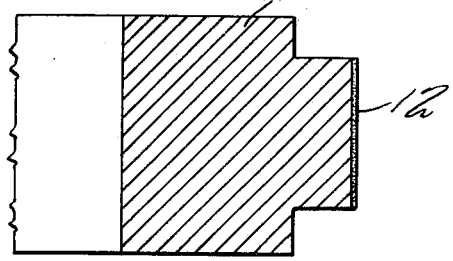
FIG. 3 is an enlarged sectional view showing the workpiece after the flame cutting operation and indicating the oxide layer.
Figure 4:
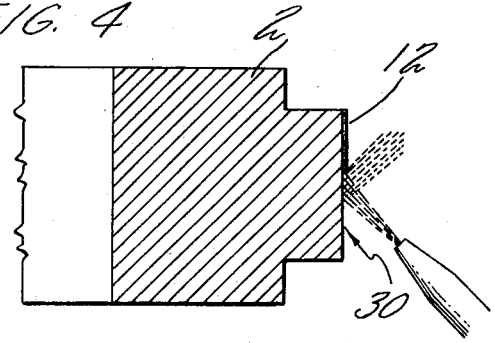
FIG. 4 is a view similar to FIG. 3 showing the removal of the oxide layer by grit blasting.
Figure 5:
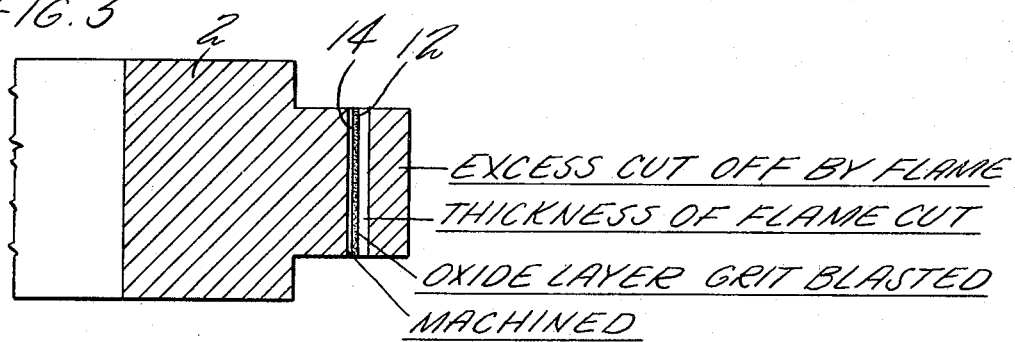
FIG. 5 is a view similar to FIG. 3 showing the finished dimension of the workpiece and the relative amounts of material removed from the workpiece by flame cutting and by machining.

The rough workpiece of FIG. 1 has the excess material 8 removed by flame cutting and this is done in a very short time by suitable modification of a cutting torch to provide the proper amount of preheat and oxygen supply. The thin oxide layer 12 of FIG. 3, which is formed during the cutting operation, is removed as by grit blasting, as shown in FIG. 4, and the last thin layer 14 of metal outside the finished dimension of the workpiece, as shown in FIG. 5, is machined away. This particular procedure, as compared to previous processes involving total machining of the excess material, saved 50 hours of machine time per piece, which represents a 34 percent reduction in terms of man-hours. Further, this process has been utilized to cut titanium alloy bar stock in $1/20$–$1/40$ of the time required for a comparable job utilizing a large abrasive saw.

Figure 7:
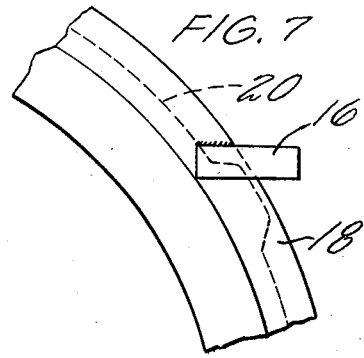
FIG. 7 shows the start of the cutting operation.

The cutting operation may be commenced by the use of a starter strip as described in my copending application Ser. No. 712,218, filed Mar. 11, 1968. For the purpose of this invention the starter strip 16, FIG. 7, is positioned on the periphery of the rough workpiece adjacent to the proposed location of one of the lugs 6, with the edge of the starter strip extending beyond the periphery of the rough flange 18. The start of the flame cutting operation is commenced in this strip. The path of the flame cutting operation is represented by the dotted line 20.

Figure 2:
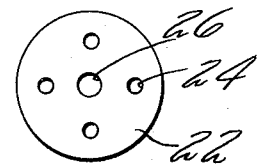
FIG. 2 is an end view of a torch tip showing the preferred arrangement of the holes for the fuel and oxygen.

The torch used for a 6 inch deep cut in titanium was an A. O. Smith cutting torch Model SC–781–A with an A. O. Smith cutting tip Model SC 12–7 modified from an 8 hole to a 4 hole preheat configuration. This tip 22, as illustrated in FIG. 2, had four preheat holes 24 arranged around a central oxygen or cutting orifice 26. The preheat holes 24 were .046 inch in diameter arranged uniformly around the cutting orifice 26 which was .140 inch in diameter.

The flow for the preheat flame was measured by a Mogul Dual Gas Flowmeter FM-2. The torch was supplied with preheat oxygen at 20 p.s.i. at an indication of 15 on the flowmeter and the acetylene was supplied at 6 p.s.i. at an indication of 25 on the flowmeter. Cutting oxygen was supplied at 120–125 p.s.i. The preheat flame was adjusted to be about 3/16 inch from the torch tip and the torch travel rate was set for 24 inches per minute after the cut was begun in the starter strip.

After the excess material 8 was completely flame cut from the rest of the workpiece, the flame cut area 30, FIG. 4, was dry grit blasted with #80 grit alumina discharged from a 3/8 inch diameter nozzle at 80 p.s.i. This blasting readily removed the developed oxide layer 12 and exposed the base material facilitating machining of the small amount of remaining material 14, FIG. 5, to produce the desired finished dimension.

The oxide layer is typically from about .005 to .030 inch thick. When the flame cutting is done as above described, the rate of cutting and the amount of heat absorbed by the workpiece is so small that the oxide layer formed is predictably uniform in thickness and so thin in depth that no oxidation will extend into the finished part. Once the oxide layer is removed only about .200 inch or less of material usually remains to be machined off the workpiece, the bulk of this material removal comprising the heat affected zone which may extend to a depth of about .15 inch.

When the workpiece is thinner, as for example, where the depth of cut is only three inches, the torch holes may be modified and the flow of oxygen and acetylene adjusted. For this thickness, an A. O. Smith torch tip of the model above described would have preheat holes .031 inch in diameter and a cutting orifice .067 inch diameter. With the same Mogul Flowmeter the preheat oxygen could be at 20 p.s.i. with a flow of 7 and the acetylene could be at 6 p.s.i. with a flow of 10. The cutting oxygen could be at 80 p.s.i. The torch travel could be at 24 inches per minute. After the cutting operation the oxide layer would be removed in the manner above described.

The particular torch constructions and modifications and the flow rates and torch travel rates are exemplary and do not define critical limitations. It will be understood that it is essential to control the preheat and cutting oxygen with respect to the torch travel rate as to produce a minimum of heat in the workpiece thereby producing a relatively smooth cut surface on the workpiece with such a thin uniform and brittle layer of alpha-oxide that it may be readily removed as by grit blasting to expose the base metal and make the final machining operation relatively simple. Obviously, with the removal of the oxide layer the material does not present the same problems and only a relatively small amount of material must be removed to reach the finished dimension of the workpiece.

It is to be understood that the invention is not limited to the specific embodiments herein illustrated and described, but may be used in other ways without departure from its spirit as defined by the following claims.

I claim:
1. The process of removing excess material from a workpiece of titanium metal or alloy including the steps of:
   oxy-acetylene cutting a substantial portion of the excess material from the workpiece by adjusting the oxygen flow rate and rate of cutting to produce a thin oxide layer consisting essentially of alpha titanium oxide,
   removing the oxide layer, and
   machining off the remainder of the excess material.
2. The process as in claim 1 wherein the oxide layer has a hardness of about Rockwell C 65.
3. The process of claim 1 wherein the oxide layer does not exceed about .030 inch in depth.
4. The process of claim 1 in which the depth of cut exceeds about 2 inches.
5. The process of removing excess material from a titanium or titanium alloy workpiece, including the steps of:
   removing from one surface of the workpiece a substantial part of the excess material by flame cutting at a rate to provide an oxide layer on the surface of the workpiece which does not exceed about .030 inch in depth,
   grit blasting the oxide layer, and
   machining the grit blasted surface to finished dimension.
6. The process of claim 5 in which the flame cutting is oxy-acetylene cutting, the preheat and cutting oxygen feed rates are selected to form a brittle layer at the cut surface which consists of alpha titanium oxide having a Rockwell C hardness of about 65.

References Cited
UNITED STATES PATENTS

| | | | |
|---|---|---|---|
| 1,787,247 | 12/1930 | Grow | 29—558 X |
| 2,309,136 | 1/1943 | Neiman. | |
| 2,482,188 | 9/1949 | Jones et al. | 148—9.6 |
| 2,805,148 | 9/1957 | De Long | 148—9 X |

JOHN F. CAMPBELL, Primary Examiner

V. A. DI PALMA, Assistant Examiner

U.S. Cl. X.R.

148—9